United States Patent [19]

Nodelman

[11] 4,230,824

[45] Oct. 28, 1980

[54] SUCROSE BASED POLYETHER POLYOLS

[75] Inventor: Neil H. Nodelman, New Martinsville, W. Va.

[73] Assignee: Mobay Chemical Corporation, Pittsburgh, Pa.

[21] Appl. No.: 914,266

[22] Filed: Jun. 12, 1978

[51] Int. Cl.³ .................... C08G 18/50; C08G 65/26; C08G 18/14

[52] U.S. Cl. ................................ 521/167; 521/175; 536/120

[58] Field of Search ................ 536/120; 521/167, 175

[56] References Cited

U.S. PATENT DOCUMENTS

| | | | |
|---|---|---|---|
| 3,085,085 | 4/1963 | Wismer et al. | 260/209 R |
| 3,153,002 | 10/1964 | Wismer et al. | 260/209 R |
| 3,190,927 | 6/1965 | Patton et al. | 260/615 |
| 3,345,557 | 10/1967 | Perrins | 323/43.5 |
| 3,357,970 | 12/1967 | Ulyatt | 260/209 |
| 3,442,888 | 5/1969 | Degginger et al. | 260/209 |
| 3,640,997 | 2/1972 | Fijal | 521/167 |
| 3,865,806 | 2/1975 | Knodel | 521/175 |
| 3,941,769 | 3/1976 | Maassen et al. | 521/167 |
| 4,105,599 | 8/1978 | Naka et al. | 521/167 |

*Primary Examiner*—H. S. Cockeram
*Attorney, Agent, or Firm*—Gene Harsh; Joseph C. Gil; R. Brent Olson

[57] ABSTRACT

The invention provides a means for making a high functional ($\geq 6.5$), low viscosity, low hydroxyl number sucrose-based polyether polyol. The process involves the use of a polyalkylene polyamine, such as diethylenetriamine, as both co-initiator and catalyst for the alkoxylation reaction of sucrose. These polyols are particularly suited for the production of rigid polyurethane foams having excellent dimensional stability, particularly at low temperatures.

11 Claims, No Drawings

SUCROSE BASED POLYETHER POLYOLS

This invention relates to the making of a novel sucrose polyether polyol having a high functionality and relatively low hydroxyl number. Such polyols are useful in preparing polyurethanes, especially polyurethane foams. The high functionality of the sucrose polyol enables the making of rigid polyurethane foams with excellent dimensional stability, particularly low temperature stability.

BACKGROUND OF THE INVENTION

There is a large amount of art relating to the production of sucrose polyols. The process most commonly employed is described in U.S. Pat. No. 3,085,085 where sucrose is dissolved in water with an oxyalkylation catalyst such as potassium hydroxide. Alkylene oxide is added over a period of time until the reaction product is a liquid. At this stage the water is removed. The remaining alkylene oxide is then added until the desired polyether polyol is obtained. This method of making sucrose polyols has been found to be satisfactory for many purposes. However, the water present during the initial alkoxylation will react to some extent with the alkylene oxide to form bifunctional by-products. Because of the low equivalent weight of water, even small amounts of water reacting under these conditions will severely reduce the functionality of the resulting polyol. High functionality of sucrose polyols is required to enhance the dimensional stability of rigid polyurethane foams made with such polyols.

Severe problems arise when water cannot be used as a solvent for high melting sucrose. Normally, solid polyols such as sucrose undergo partial decomposition as they melt and these solid compounds are insoluble in any oxyalkylation-resistant solvents. Prior art in this regard is discussed e.g. in U.S. Pat. Nos. 3,190,927 and 3,345,557. In these patents a solution is given as to how to get sucrose into a form in which it can be alkoxylated. An adduct of the high melting polyol with 1 to 4 mols of an alkylene oxide is disclosed as a suitable solvent for the full alkoxylation process. The disadvantage of this process is that it must be carried out in two stages. A similar process is disclosed in U.S. Pat. No. 3,357,970.

In U.S. Pat. No. 3,442,888 the sucrose is mixed with a substantial amount of glycerol and an alkali metal hydroxide catalyst. These polyols, however, also suffer from the fact that glycerol, with a functionality of only three, must be used in large amounts. The products are inevitably low functional sucrose polyols.

In U.S. Pat. No. 3,640,997 sucrose is mixed with specific amounts of low functional ethylene diamine and a specific amount of an alkali metal hydroxide catalyst. The patent specifically discloses a lower limit of 0.6 mols of ethylene diamine which can be used per mol of sucrose. Less than this amount creates solubility problems. The sucrose cannot completely react and will precipitate out of the polyol. The use of at least 0.6 mols of EDA/mol of sucrose places an upper limit on the functionality of the polyol produced. The highest functional polyol in the examples of the patent is 5.6.

In U.S. Pat. No. 3,865,806, sucrose and a tertiary amine catalyst are directly alkoxylated with a blend of ethylene oxide and vicinal alkylene oxide having 3 to 4 carbon atoms. The patent requires the blending of alkylene oxides and produces a relatively inactive polyol although high functionality polyols are produced.

In U.S. Pat. No. 3,941,769, sucrose is added to an inert aromatic hydrocarbon solvent such as toluene. Specific amounts of a short chained polyol, monoamine or polyamine, a small quantity of water, and a small amount of alkali metal hydroxide catalyst are added to the suspension followed by alkoxylation. High functional polyols can be produced by this method i.e. with a functionality of 7 or more. However, polyols with a functionality of more than about 6.5 can only be obtained at the expense of cutting the alkoxylation short, i.e., stopping the alkoxylation before the OH number is reduced below about 400. Each polyol produced in the reference which has an OH number below 400 also has a functionality of significantly less than 6.5. Example 4 shows a polyol with a functionality of 7.18 but a hydroxyl number of 519 and a viscosity of 400,000 cP. Polyols with viscosities in such a range cannot be easily handled by conventional foaming equipment. The viscosity can only be lowered as the alkoxylation proceeds and the OH number is lowered. The functionality of the resulting polyol would be significantly reduced as the alkoxylation continues because more and more water will react, forming difunctional polyols.

The object of the present invention is to provide a process for making a high functional, low hydroxyl number (and low viscosity), amine co-initiated sucrose-based polyether polyol.

DESCRIPTION OF THE INVENTION

The present invention is directed to the use of polyalkylene polyamines as both catalyst and co-initiator in the alkoxylation of sucrose. Polyalkylene polyamines are mentioned in U.S. Pat. No. 3,941,769 as possible co-initiators. However, the patent mentions low molecular weight, high valent alcohols and amino alcohols as preferred compounds to be used. The patent does not use a polyalkylene polyamine in any example. The patent does not lead to the discovery, which is the subject of this invention, that high functional, low viscosity/low OH number sucrose based polyether polyols can be produced.

The present invention, therefore, relates to a novel sucrose-based polyether polyol and its method of preparation wherein alkylene oxides are reacted with a mixture containing:

(A) 100 parts by weight of sucrose;
(B) up to 1.3 parts by weight of water;
(C) 4–50 parts by weight of a polyalkylene polyamine containing at least three nitrogen atoms and at least four active hydrogen atoms attached to the nitrogen atoms;
(D) from about 50–110 parts by weight of an aromatic hydrocarbon solvent.

The polyalkylene polyamine acts as both a co-initiator with the sucrose and as a catalyst for the alkoxylation reaction. The polyamine also imparts to the resulting polyol the characteristic of being an "active" polyol, i.e., short foaming times are experienced in the polyurethane foam forming reaction. This can enable the foaming time to be shortened (all other formulation components being the same) or enable the foam producer to reduce the amount of catalyst used as compared with what would otherwise be required to obtain similar foaming times with less active polyols.

It is preferred that the polyamine contain at least 5 active hydrogen atoms attached to nitrogen atoms.

Typical polyalkylene polyamines can be represented by the following general formula

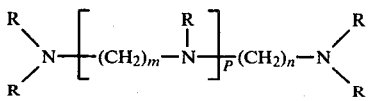

wherein
m and n are the same or different and are integers of from 2-20, preferably 2 or 3, and
p is an integer of from 1-10, preferably 1-2
R is H or $C_1$-$C_{18}$ alkyl (at least four and preferably at least five of the R groups being H), preferably H or $C_1$-$C_4$ alkyl.

Other polyalkylene polyamines are suitable such as those containing a piperazine ring. Examples of such polyamines include diethylene triamine, triethylene tetraamine, tetraethylene pentamine, etc., dipropylene triamine and 1,4-bis (aminopropyl) piperazine. Most preferred is diethylene triamine. These polyamines may be used in amounts ranging from 4 to 50 parts by weight based on 100 parts of sucrose, preferably 5-20 parts by weight.

The present process can be carried out with up to about 1.3 parts by weight of water based on 100 parts of sucrose. At least trace amounts of water seem to be necessary for the alkoxylation reaction. The precise reason for this is not known but it is possible that the water has a catalytic effect in helping to open the alkylene oxide ring and thus speed the alkoxylation reaction. Trace amounts of water are normally found in commercial grades of the reactants of the present process, particularly in the sucrose which will readily absorb moisture from the air. So trace amounts are desirable and need not be removed. As an upper limit on the amount of water desired in the sucrose mixture, it must be kept in mind that even small amounts of water have a significant effect on lowering the final functionality of the resulting polyol. Thus, large amounts and certainly amounts in excess of 1.3 parts by weight of water are undesirable.

Any aromatic hydrocarbon solvent which is inert under the reaction conditions and has a boiling point in the range of from about 80° to 180° C. may be used. Such solvents include toluene, xylene, benzene, chlorobenzenes, ethyl benzene, etc. Toluene is preferred. These solvents may also be mixed with aliphatic solvents with comparable boiling points. There is essentially no upper limit to the amount of solvent which can be used. However, practically it is advisable to minimize the amount used since it eventually has to be removed from the final product. Sufficient solvent should be used to provide a slurrying media for the sucrose. Generally from 50-110 parts by weight of solvent per 100 parts sucrose should be used.

Suitable alkylene oxides include any of those known in the art. These include ethylene oxide, 1,2-propylene oxide, 1,2-butylene oxide and 2,3-butylene oxide and the like. Preferred, however, are ethylene oxide and propylene oxide, and most preferably in the sequence discussed below. The amount of oxide used depends on the desired length of the chains from the sucrose i.e. the desired OH number. In general, OH numbers of greater than 550, preferably 400 are not desired because of their larger viscosities. In principle, because of the small amounts of water used, there is no theoretical lower limit for the OH number. The functionality of the polyol should not substantially decrease as the alkoxylation proceeds. In general, it is desired to use alkylene oxide in amounts sufficient to give OH numbers in the range of from 300-550, preferably 300-400 and viscosities at 25° C. of from 15,000 to 40,000 mPa.s, preferably 20-30,000 mPa.s.

The reaction may be carried out in the presence of an alkali metal hydroxide as catalyst, preferably sodium or potassium hydroxide, most preferably potassium hydroxide. This is particularly true of the later stages of the reaction. The hydroxide is normally used in the form of an approximately 50% aqueous solution. The amount of hydroxide used can vary anywhere from 0.1-1.0 parts by weight per 100 parts by sucrose. Equivalent amounts of other hydroxides would be used. The hydroxide must be neutralized at the end of the reaction. The water added when the hydroxide is added may be immediately distilled if it is felt that there is too much water in the batch. The basic catalyst cannot be used at the beginning of high functional, sucrose-based polyol reactions because hydroxide addition to the slurry causes the sucrose to agglomerate into unstirrable and unreactive clumps. The hydroxide is therefore only added after partial alkylation preferably when all the sucrose has dissolved.

The most advantageous method of carrying out the reaction is to add the water, if desired, and the solvent to the reactor at ambient temperature and then add the sucrose at once with stirring. The mixture is then heated to approximately 60°-100° C., preferably about 80° so that the polyalkylene polyamine will not cake when it is charged to the sucrose slurry. The polyalkylene polyamine is then charged to the reactor. A nitrogen pressure of anywhere from about 15 psig to 200 psig, preferably 25 to 140 psig, and most preferably about 2 atmospheres, is then built up in the reactor.

The reaction of the alkylene oxide is done under typical conditions for making polyether polyols, i.e. at a temperature of from about 70° C. to 160° C., preferably 80° C. to 120° C.

A preferred embodiment of the invention is to add anywhere from about 5 to 15% of the alkylene oxides used as ethylene oxide at the beginning of the alkoxylation. The alkoxylation is then completed with propylene oxide. This initial ethylene oxide charge tends to preserve both the strength and duration of the catalytic activity of the polyalkylene polyamine. This is apparently due to the fact that the nitrogen atoms of the polyamine are not severely hindered with ethylene oxide addition as they would be with propylene oxide and other higher molecular weight oxides. Thus, it is best to add at least as much ethylene oxide as is necessary to react with all the active hydrogen atoms attached to the nitrogen atoms of the polyalkylene polyamine prior to the use of other alkylene oxides.

While it is possible to avoid the use of alkali metal hydroxide catalysts altogether, the reaction tends to slow at its later stages even with the polyalkylene polyamines. However, the reaction is quite fast in the early stages up to the time all the sucrose in the reaction vessel has dissolved. All the sucrose tends to dissolve when from about 50-65% of the total oxide has been added. At this point, there is no problem at all in adding a hydroxide catalyst to the reaction batch. No clumping occurs once the sucrose is completely dissolved. Therefore, it is another preferred embodiment of the invention to add an alkali metal hydroxide to the batch at this point in the reaction sequence in order to speed the reaction to its completion at the desired OH number. As previously mentioned, the batch can be dewatered at this point, if desired, to keep the water content low.

When the alkylene oxide addition is complete the polymer is neutralized in known manner, e.g. by dilute mineral acid addition. The remaining water and hydrocarbon solvent are distilled off i.e. at higher temperatures, under vacuum. The salts produced by the neutralization are removed by filtration by known methods.

The polyalkylene polyamine catalyst/co-initiator provides a means for catalyzing the alkoxylation reaction in its early stages. The catalyst/co-initiator is highly functional. This means that more can be added on a molar basis than lower functional co-initiators such as triethanolamine and ethylene diamine to obtain the same final polyol functionality. The higher amine content aids in the speed of the alkoxylation reaction and also in enhancing the activity of the final polyol.

The present invention, thus enables the making of a high functional, moderate viscosity and hydroxyl number sucrose based polyether polyol. The problems inherent with the use of sucrose are obviated, i.e. the fact that it takes a large amount of co-initiator to get the sluggish reaction off the ground, a sluggishness which cannot be obviated with the use of alkali metal hydroxide catalyst because it causes clumping in the sucrose slurry.

The polyols produced by the above described process are useful as starting components in the preparation of polyurethanes, particularly rigid polyurethane foams which have good dimensional stability, particularly at low temperatures.

The present polyols also have excellent activity when used as a polyol in a polyurethane foaming reaction. When compared to foaming reactions with a typical polyol and a given amount of catalyst, foaming reactions using the polyols prepared by the present process exhibit significantly reduced gellation and tack-free times.

Means for making rigid and other polyurethane foams from polyisocyanates, polyether polyols, catalysts, water and/or other blowing agents e.g. Freon, stabilizers and other additives are well known.

EXAMPLES

EXAMPLE 1

A polyether polyol was prepared using the following components (given in parts by weight).
880 pts Toluene
135 pts Diethylene triamine
12 pts Water
1414 pts Sucrose
445 pts Ethylene oxide
2226 pts Propylene oxide
66 pts Potassium hydroxide (45% solution in water)
1780 pts Propylene oxide The toluene solvent, water and sucrose were added to the reaction vessel with vigorous stirring. This mixture was heated to about 80° C. and the reaction vessel then evacuated of air and replaced with a nitrogen atmosphere. The diethylene triamine was then added to the reaction mixture and a nitrogen pressure of 30 psig placed on the reactor. The reaction mixture was heated to about 105° C. and the ethylene oxide charge begun. The oxide was added at a rate such that the batch temperature remained in the 100°–120° C. range without significant external heating or cooling. Following the ethylene oxide addition, the initial propylene oxide charge was begun. Upon its completion, there was no visible undissolved sucrose. At this point, the KOH was added followed by an azeotropic distillation of water and toluene. The remaining propylene oxide was then added under the same conditions mentioned above.

The product was treated with water in an amount of about 10% of the batch weight. Sufficient aqueous sulfuric acid to neutralize the potassium hydroxide was then added. The batch was then dewatered to about 1% water. A filtering agent was then added and further dewatering down to 0.1% water. The product was then filtered.

The product had the following properties:
OH functionality: 6.7
OH number: 361
Acid number: 0.09
Ph: 9.7
H$_2$O: 0.03%
Viscosity: 23,600 mPa.sec.
Color (Gardner): 12
% polypropylene glycol: 1.2%

EXAMPLE 2

The following formulations were hand mixed and allowed to freely foam.

|  |  | A | B | C | D |
|---|---|---|---|---|---|
| Polyol from Example 1 | | — | 100.0 | — | 100.0 |
| Polyol A[1] | | 100.0 | — | — | — |
| Voranol 370[2] | | — | — | 100.0 | — |
| Water | | 1.0 | 1.0 | 1.0 | — |
| DC - 193[3] | | 1.5 | 1.5 | 1.5 | 1.5 |
| Dabco R - 8020[4] | | 1.5 | 1.5 | 1.5 | 2.0 |
| R-11-B[5] | | 35.0 | 35.0 | 35.0 | 30.0 |
| Density (kg/m$^3$) | | 23.8 | 23.5 | 23.5 | — |
| % closed cells | | 80.6 | 83.9 | 76.1 | — |
| Dimensional Stability (% Vol. Change) | | | | | |
| 70° C./100% R.H. | 1 day | 11.0 | 12.1 | 10.1 | — |
| | 7 days | 14.7 | 9.6 | 8.7 | — |
| | 14 days | 14.3 | 9.4 | 7.2 | — |
| | 28 days | 13.6 | 7.8 | 6.5 | — |
| 100° C./Amb. R.H. | | | | | |
| | 1 day | 1.6 | 2.4 | 2.1 | — |
| | 7 days | 6.4 | 9.3 | 5.6 | — |
| | 14 days | 6.6 | 11.5 | 5.2 | — |
| | 28 days | 7.5 | 12.8 | 4.2 | — |
| −30° C./Amb. R.H. | 1 day | −0.6 | 0.2 | −0.1 | — |
| | 7 days | −0.7 | −0.2 | −0.4 | — |
| | 14 days | −0.3 | −0.4 | −0.3 | — |
| | 28 days | −1.0 | −1.1 | 0.0 | — |
| Reactivity | | | | | |
| Mix Time[6] (Sec.) | | 10 | 10 | 10 | — |
| Cream Time[7] (Sec.) | | 35 | 20 | 25 | 27 |
| Gel Time[8] (Sec.) | | 150 | 75 | 125 | 61 |
| Tack Free Time[9] (Sec.) | | 215 | 100 | 175 | 72 |

-continued

|  | A | B | C | D |
|---|---|---|---|---|
| Rise Time[10] (Sec.) |  | 310 | 140 | 220 | — |

As can be seen from the comparisons, the gel, tack-free and rise times for the foams produced with the polyol of the present invention are significantly lower than those foams using a conventional sucrose-based polyol and another high-functional sucrose polyol (Voranol 370).

[1]Polyol A is a sucrose-based polyether with a hydroxyl number of 380 available from Mobay Chemical Corp.
[2]Voranol 370 is a high functional (>6.5) sucrose polyol, believed to be prepared with triethyl amine co-initiator and a mixed EO/PO block according to U.S. Pat. No. 3,865,806, having an OH number of about 350 and available from Dow Chemical.
[3]DC-193 is a polysiloxane surfactant foam Dow-Corning for use in rigid foams.
[4]Dabco R-8020 is an amine catalyst from Air Products Corp.
[5]R-11-B is monofluorotrichloro methane blowing agent.
[6]Mix Time: the duration of mixing after the isocyanate is added to the resin blend.
[7]Cream Time: the elapsed time from the start of mix time until the time at which a change in color of the mixed liquid from brown to creamy tan is noted.
[8]Gel Time: the elapsed time from the start of mix time until the time at which a ⅛" diameter applicator stick inserted 2" into the rising foams, pulls with it a 6" long "string" when it is quickly removed from the foam.
[9]Tack Free Time: the elapsed time from the start of mix time until the time at which a clean dry tongue depressor lightly touched to the foam surface can be removed without pulling off the foam surface.
[10]Rise Time: the elapsed time from the start of mix time until the time at which no additional visible foam rise can be observed.
Foam D was only tested for reactivity.

What is claimed is:

1. In a process for the preparation of sucrose-based polyether polyols having a functionality of at least 6.5 and an OH number of 400 or less by the alkoxylation of sucrose with an alkylene oxide, the improvement which comprises reacting the alkylene oxide with a sucrose mixture containing:
    (A) 100 parts by weight of sucrose;
    (B) up to 1.3 parts by weight of water;
    (C) 4-50 parts by weight of a polyalkylene polyamine containing at least three nitrogen atoms and at least four active hydrogen atoms attached to the nitrogen atoms;
    (D) from about 50-110 parts by weight of an aromatic hydrocarbon solvent.

2. The process of claim 1 wherein an initial amount of ethylene oxide is used as the alkylene oxide and in sufficient amount to react with substantially all of the active hydrogen atoms of the polyalkylene polyamine.

3. The process of claim 2 wherein the remaining alkylene oxide used to alkoxylate the sucrose mixture is propylene oxide.

4. The process of claim 1 wherein an alkali metal hydroxide catalyst is added to the sucrose mixture once all the sucrose has dissolved in the reacting polyol.

5. The process of claim 1 wherein said polyalkylene polyamine has at least 5 active hydrogen atoms attached to nitrogen atoms.

6. The process of claim 1 wherein the polyalkylene polyamine is denoted by the formula:

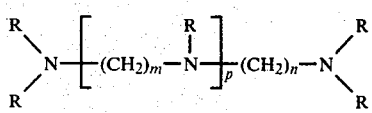

where
p = 1 to 10
m,n are integers and may be the same or different and represent 2–20;
R = H or $C_1$–$C_{18}$ alkyl as long as at least four R groups are H.

7. The process of claim 6 wherein
m,n = 2 or 3;
R = H or $C_1$–$C_4$ alkyl and at least 5 R groups are H;
p = 1 or 2.

8. The process of claim 7 wherein the polyamine is diethylene triamine.

9. The process of claim 1 wherein the aromatic hydrocarbon solvent is toluene.

10. The product of the process of claim 1.

11. In a process for the preparation of rigid polyurethane foam in which polyisocyanates are reacted with compounds containing active hydrogen atoms in the presence of a blowing agent and other auxiliary components, the improvement which comprises using as the active hydrogen containing compound a sucrose-based polyether produced by the process of claim 1.

* * * * *